United States Patent
Adachi et al.

(10) Patent No.: US 8,637,770 B2
(45) Date of Patent: Jan. 28, 2014

(54) CAULKING DIE AND BRAID FIXING STRUCTURE FOR SHIELD WIRE

(75) Inventors: Hideomi Adachi, Kosai (JP); Hidehiko Kuboshima, Kosai (JP)

(73) Assignee: Yazaki Corporation, Tokyo (JP)

( * ) Notice: Subject to any disclaimer, the term of this patent is extended or adjusted under 35 U.S.C. 154(b) by 476 days.

(21) Appl. No.: 12/787,504

(22) Filed: May 26, 2010

(65) Prior Publication Data

US 2010/0300749 A1 Dec. 2, 2010

(30) Foreign Application Priority Data

May 28, 2009 (JP) ................................. 2009-128935

(51) Int. Cl.
*H02G 15/02* (2006.01)
(52) U.S. Cl.
USPC .......... 174/74 R; 174/78; 174/84 R; 174/84 C
(58) Field of Classification Search
USPC ... 174/74 R, 78, 84 R, 84 S, 94 R, 94 S, 75 C
See application file for complete search history.

(56) References Cited

U.S. PATENT DOCUMENTS

| | | | | |
|---|---|---|---|---|
| 6,042,396 | A * | 3/2000 | Endo et al. ....................... | 439/98 |
| 6,186,802 | B1 * | 2/2001 | Masuda et al. ................... | 439/98 |
| 6,358,069 | B2 * | 3/2002 | Yoshioka et al. ............. | 439/108 |
| 6,583,352 | B2 * | 6/2003 | Fukushima et al. .......... | 174/373 |
| 6,649,839 | B2 * | 11/2003 | Eckert et al. ................ | 174/74 R |
| 6,781,059 | B2 * | 8/2004 | Mizutani ...................... | 174/75 C |
| 6,864,426 | B2 * | 3/2005 | Miyazaki ..................... | 174/75 C |
| 7,094,970 | B2 * | 8/2006 | Kihira .......................... | 174/74 R |
| 7,247,795 | B2 * | 7/2007 | Sumi et al. ................... | 174/74 R |
| 7,666,032 | B2 * | 2/2010 | Aoki et al. ............... | 439/607.41 |
| 7,749,025 | B2 * | 7/2010 | Aoki et al. ............... | 439/607.41 |
| 2004/0099427 | A1 * | 5/2004 | Kihira .......................... | 174/35 C |
| 2009/0093159 | A1 * | 4/2009 | Aoki et al. ..................... | 439/610 |

FOREIGN PATENT DOCUMENTS

| | | | | |
|---|---|---|---|---|
| CN | 101404370 | A | * 10/2008 | .......... H01R 13/684 |
| CN | 101404370 | A | 4/2009 | |
| JP | 2002-329557 | A | 11/2002 | |
| JP | 2009-87902 | A | 4/2009 | |

OTHER PUBLICATIONS

Communication dated Jul. 20, 2012 issued by the State Intellectual Property Office of P.R. China in counterpart Chinese Application No. 201010188518.4.

(Continued)

*Primary Examiner* — William H Mayo, III
(74) *Attorney, Agent, or Firm* — Sughrue Mion, PLLC (57) ABSTRACT

A step-shaped receptacle part 22 depressed in a step shape in a circumferential direction is provided in a middle part of an outer peripheral surface 21 of a core body 18 of a core 16 constituting a caulking die 5. Further, a part on a core insertion start side relative to the step-shaped receptacle part 22 is formed in a size smaller than that at the position of the step-shaped receptacle part 22. Caulking is performed by the caulking die 5 having this configuration, so that the fixing state viewed in a cross section in a connection and fixation target part is made such that a plurality of bent parts are formed in accordance with the sectional shape of the step-shaped receptacle part 22.

9 Claims, 6 Drawing Sheets

(56) References Cited

OTHER PUBLICATIONS

Office Action dated May 7, 2013 issued by the Japanese Patent Office in counterpart Japanese Patent Application No. 2009-128935.

Office Action dated Oct. 21, 2013 issued by the State Intellectual Property Office of P.R. China in corresponding Chinese Patent Application No. 201010188518.4.

* cited by examiner

CAULKING DIE AND BRAID FIXING STRUCTURE FOR SHIELD WIRE

BACKGROUND OF INVENTION

1. Field of the Invention

The present invention relates to a braid fixing structure for shield wire and a caulking die used for this fixing structure.

2. Description of the Related Art

A shield wire (corresponding to a motor cable, in this example) like that connected to an inverter or a motor in an electric vehicle or a hybrid car is constructed from: a plurality of electric wires; a metal shield shell having electric conductivity; and a tube-shaped braid having electric conductivity and collectively covering the plurality of electric wires. The shield wire has an end part structure that the braid end part is connected and fixed to the shield shell. Further, the shield wire has an end part structure that the braid is grounded through the shield shell to a shielding case.

As for the connection and fixation between the braid end part and the shield shell, the following JP-A-2002-329557 discloses as follows. That is, as means of connecting and fixing the braid end part and the shield shell to each other, first, the braid end part is fit over the outer peripheral surface of a tube-shaped braid holding part in the shield shell. Then, a caulking ring of metal ring construction is fit over the outer side of the braid end part. After that, caulking is performed on the caulking ring and the braid holding part such that a groove in the circumferential direction is formed from the outer periphery side. As a result, the braid end part is firmly pinched between the caulking ring and the braid holding part, so that the braid end part and the shield shell are connected and fixed to each other.

In the means of connecting and fixing the braid end part and the shield shell to each other disclosed in JP-A-2002-329557, a core having a groove-shaped receptacle part provided in the circumferential direction in the outer periphery need be set inside the tube-shaped braid holding part. Then, the outer peripheral surface of the caulking ring need be stamped by a dice whose inner surface has a protruding rim in the circumferential direction. Nevertheless, in the situation after the caulking, the protruding rim that protrudes in the circumferential direction from the inner peripheral surface of the braid holding part has entered into the groove-shaped receptacle part of the core. This inhibits the core from being extracted from the braid holding part. In contrast to this situation, a core constructed as an integration of a plurality of components may be employed. Then, when the core is to be extracted from the braid holding part, one component at the center may be extracted among the plurality of components. After that, the remaining components in contact with the inner peripheral surface of the braid holding part may be slid inward in the radial direction. This approach permits extraction of the core from the braid holding part.

When the core constructed as an integration of a plurality of components is employed, problems arise that the core has a complicated structure and that poor workability is caused in association with the extraction of the core after the caulking.

BRIEF SUMMARY OF THE INVENTION

Here, as means of connecting and fixing a braid end part without employing caulking, an example of employable means is that the braid end part is fit over a tube-shaped braid holding part, and then a ring is simply pressed over this part so that the braid end part is fixed by pinching. This approach effectively resolves the above-mentioned problem, but causes another problem of an insufficient fixing force.

The present invention has been devised in view of the above-mentioned situation. An object of the present invention is to provide a caulking die and a braid fixing structure for shield wire in which extraction of a core is allowed after caulking while a fixing force for connection and fixation of a braid end part is increased satisfactorily.

The caulking-die according to an first aspect of the present invention that is devised for the purpose of resolving the above-mentioned problem is a caulking die for connecting and fixing, by caulking, an end part of a braid in a shield wire including a plurality of electric wires, a metal shield shell having electric conductivity, and a tube-shaped braid having electric conductivity and collectively covering the plurality of electric wires, onto an outer peripheral surface of a tube-shaped braid holding part in the shield shell, the caulking die including: a core freely insertable into and extractable from the braid holding part along an axis of the braid holding part; and a dice that is freely opened and closed in a direction perpendicular to the axis and performs caulking on a connection and fixation target part, wherein a step-shaped receptacle part depressed in a step shape in a circumferential direction is provided in a middle part of an outer peripheral surface of a core body of the core, while a part on a core insertion start side relative to the step-shaped receptacle part is formed in a size smaller than that at the position of the step-shaped receptacle part, and while a position of caulking to be performed by the dice is set up in alignment with a position of the step-shaped receptacle part such that a difficulty is not caused in extraction of the core from the braid holding part.

According to the present invention having such features, as a result of caulking, a protruding rim protruding from the inner peripheral surface of the braid holding part to the circumferential direction enters into the step-shaped receptacle part of the core body. The step-shaped receptacle part provided in a middle part of the outer peripheral surface of the core body is depressed in a step shape in the circumferential direction of the outer peripheral surface of the core body. Further, a part on the core insertion start side relative to the step-shaped receptacle part is formed in a size smaller than that at the position of the step-shaped receptacle part. Thus, according to the present invention, at the time of extracting the core from the braid holding part, the core is prevented from hitting the above-mentioned protruding rim.

The braid fixing structure for shield wire according to a second aspect of the present invention that is devised for the purpose of resolving the above-mentioned problem is a braid fixing structure for shield wire for connecting and fixing, by caulking, an end part of a braid in the shield wire including a plurality of electric wires, a metal shield shell having electric conductivity, and a tube-shaped braid having electric conductivity and collectively covering the plurality of electric wires, onto an outer peripheral surface of a tube-shaped braid holding part in the shield shell, wherein at the time of connecting and fixing the braid end part to the braid holding part, a caulking die is used that includes: a core freely insertable into and extractable from the braid holding part along an axis of the braid holding part; and a dice that is freely opened and closed in a direction perpendicular to the axis and performs caulking on a connection and fixation target part, and further a caulking ring of metal ring construction is used that is inserted over of the braid end part and then undergoes caulking performed by the dice so as to be deformed, wherein a step-shaped receptacle part depressed in a step shape in a circumferential direction is provided in a middle part of an outer peripheral surface of a core body of the core, while a part on a core insertion start side relative to the step-shaped receptacle part is formed in a size smaller than that at the position of the step-shaped receptacle part, and while a position of caulking to be performed by the dice is set up in alignment with a position of the step-shaped receptacle part such that a difficulty is not caused in extraction of the core from the braid holding part, and wherein caulking is performed in this situation so that a cross-sectional fixing state in the connection and fixation target part composed of the braid holding part, the caulking ring, and the braid end part located in between is made such that a plurality of bent parts are formed in accordance with the sectional shape of the step-shaped receptacle part.

According to the present invention having such features, as a result of caulking, a protruding rim protruding from the inner peripheral surface of the braid holding part to the circumferential direction enters into the step-shaped receptacle part of the core body. The step-shaped receptacle part provided in a middle part of the outer peripheral surface of the core is depressed in a step shape in the circumferential direction of the outer peripheral surface of the core. Thus, the connection and fixation target part composed of a braid holding part, a caulking ring, and a braid end part located in between is fixed in a state that a plurality of bent parts are formed in accordance with the sectional shape of the step-shaped receptacle part. That is, according to the present invention, the braid is connected and fixed with a sufficient fixing force. The step-shaped receptacle part is depressed in a step shape in the circumferential direction of the outer peripheral surface of the core body as described above. Further, a part on the core insertion start side relative to the step-shaped receptacle part is formed in a size smaller than that at the position of the step-shaped receptacle part. Thus, according to the present invention, at the time of extracting the core from the braid holding part, the core is prevented from hitting the above-mentioned protruding rim.

The braid fixing structure for shield wire according to a third aspect of the present invention that is a braid fixing structure for shield wire, wherein the tube-shaped braid holding part and the caulking ring of ring shape are formed such that walls thereof are included relative to the axis of the braid holding part and such that the interval between the walls is reduced gradually toward the tip of the braid holding part, and wherein the outer peripheral surface of the core body is also formed such as to be inclined relative to the axis and have a diameter reduced gradually toward the core insertion start side.

According to the present invention having such features, when the core is moved in the extraction direction, contact between the braid holding part and the core body is lost immediately. Thus, the core is smoothly extracted from the braid holding part.

The braid fixing structure for shield wire according to the present invention described in fourth aspect of the invention is a braid fixing structure for shield wire, wherein the braid end part is folded inward such that a two-ply structure is formed.

According to the present invention having such features, by virtue of the two-ply structure in the braid end part, the mesh of the braid connected and fixed to the braid holding part becomes dense. Thus, even when the braid end part is spread and inserted over the braid holding part, the shielding performance is achieved satisfactorily. Further, the two-ply structure in the braid end part avoids the necessity of after treatment such as cutting a pointed end part in the braid end part. Furthermore, the two-ply structure in the braid end part contributes to prevention of fraying in the braid end part.

The present invention described in the first aspect of the invention has the effect of providing a caulking die in which even when caulking is performed such that a protruding rim is generated that protrudes from the inner peripheral surface of the braid holding part to the circumferential direction, extraction of the core is allowed. Further, the use of this caulking die has an effect that the fixing force for connection and fixation of the braid end part is increased satisfactorily.

According to the present invention described in the second aspect of the invention, a caulking die is employed in which even when caulking is performed such that a protruding rim is generated that protrudes from the inner peripheral surface of the braid holding part to the circumferential direction, extraction of the core is allowed. Thus, an effect is obtained that the fixing force for connection and fixation of the braid end part is satisfactorily increased structurally.

The present invention described in the third aspect of the invention has an effect that the inclined structure allows the core to be extracted easily from the braid holding part.

According to the present invention described in the fourth aspect of the invention, the two-ply structure is formed in the braid end part so that the braid density is increased. This provides the effect of improving the shielding performance. Another effect is also obtained that the necessity of after treatment for the braid end part is avoided so that the workability is improved and the cost is reduced. Yet another effect is obtained that fraying in the braid end part is avoided.

DETAILED DESCRIPTION OF THE INVENTION

A step-shaped receptacle part depressed in a step shape in the circumferential direction is provided in a middle part of the outer peripheral surface of a core body of a core constituting a caulking die. Further, a part on the core insertion start side relative to the step-shaped receptacle part is formed in a size smaller than that at the position of the step-shaped receptacle part. Then, caulking is performed by the caulking die having this configuration, so that the fixing state viewed in a cross section in a connection and fixation target part is made such that a plurality of bent parts are formed in accordance with the sectional shape of the step-shaped receptacle part. As a result of the caulking, a protruding rim is generated that protrudes from the inner peripheral surface of the braid holding part to the circumferential direction. However, the shapes of the step-shaped receptacle part and the part on the core insertion start side do not cause difficulty in the extraction of the core.

Embodiment 1

Figure 1:
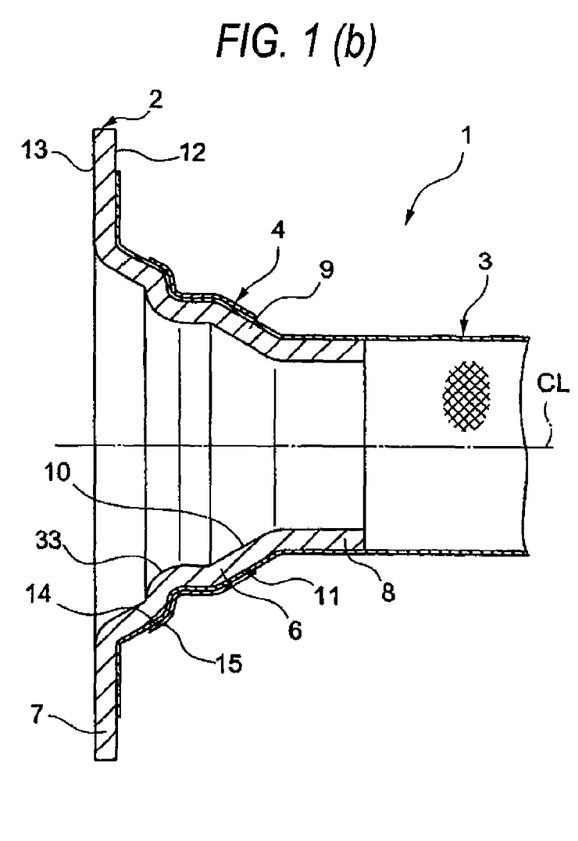
FIG. 1 is a diagram showing a braid fixing structure for shield wire and a caulking die according to the present invention. Part (a) shows a sectional view obtained at the time of caulking. Part (b) shows a sectional view illustrating a situation that the caulking die has been removed.

A first embodiment is described below with reference to the drawings. FIG. 1 is a diagram showing a braid fixing structure for shield wire and a caulking die according to the present invention.

In FIG. 1, reference number 1 indicates a shield wire for electrically connecting a motor and an inverter, for example, in an electric vehicle or a hybrid car (a part relevant to the present invention is shown solely). The shield wire 1 according to the present embodiment is used as a motor cable, and constructed from: a plurality (e.g., three) of electric wires (not shown); a metal shield shell 2 having electric conductivity; a tube-shaped braid 3 having electric conductivity and collectively covering the plurality of electric wires; and a caulking ring 4 of metal ring construction that is inserted over the end part of the braid 3 and then undergoes caulking.

The shield wire 1 has an end part structure that the end part of the braid 3 is connected and fixed to the shield shell 2 as a result of caulking performed by the caulking die 5. Further, the shield wire 1 has an end part structure that the braid 3 is grounded through the shield shell 2 to a shielding case (not shown) for the motor or the inverter. In the connection and fixation between the braid 3 and the shield shell 2, a firm fixation is achieved.

Figure 2:
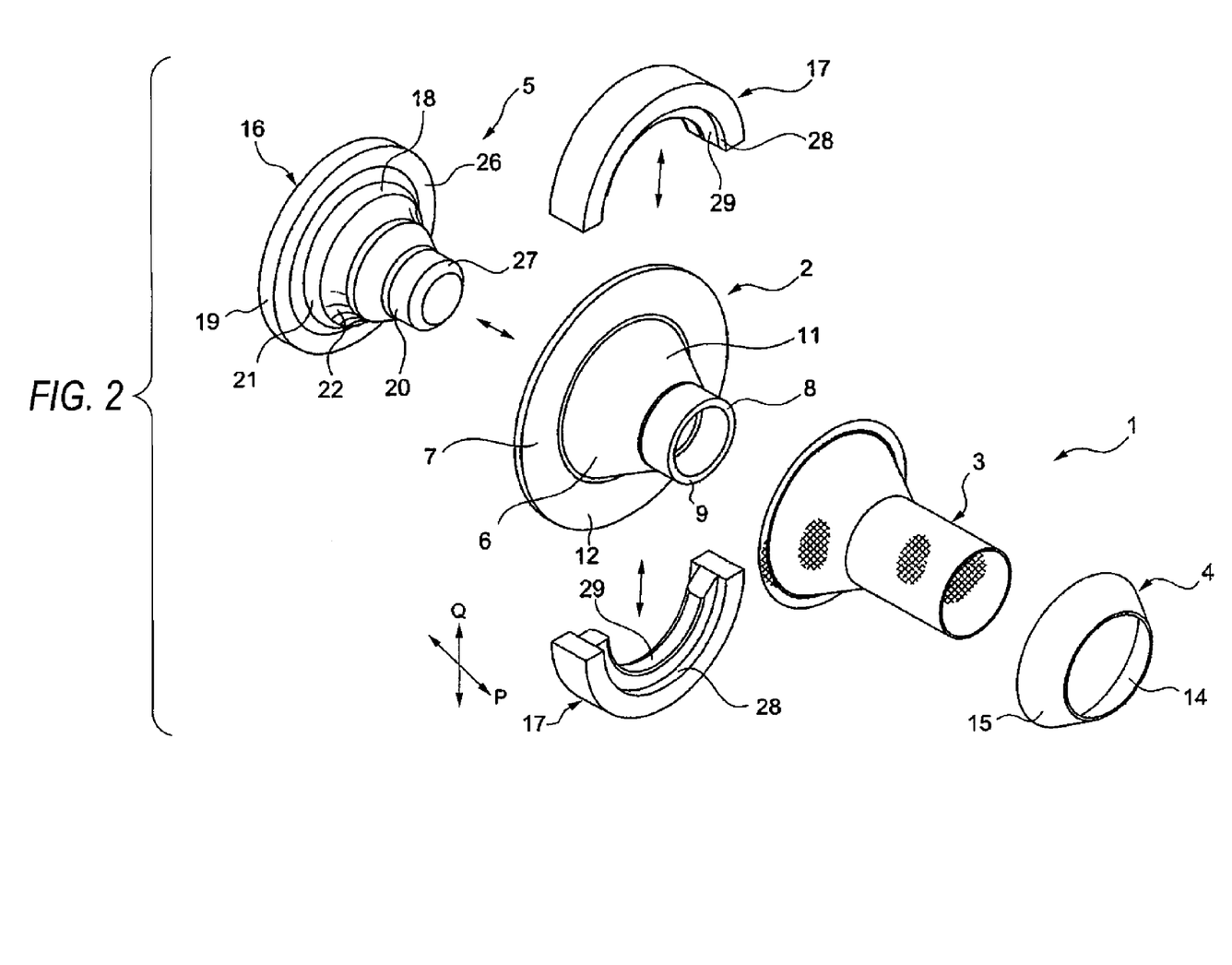
FIG. 2 is an exploded perspective view of a shield wire end part and a caulking die.
Figure 3:
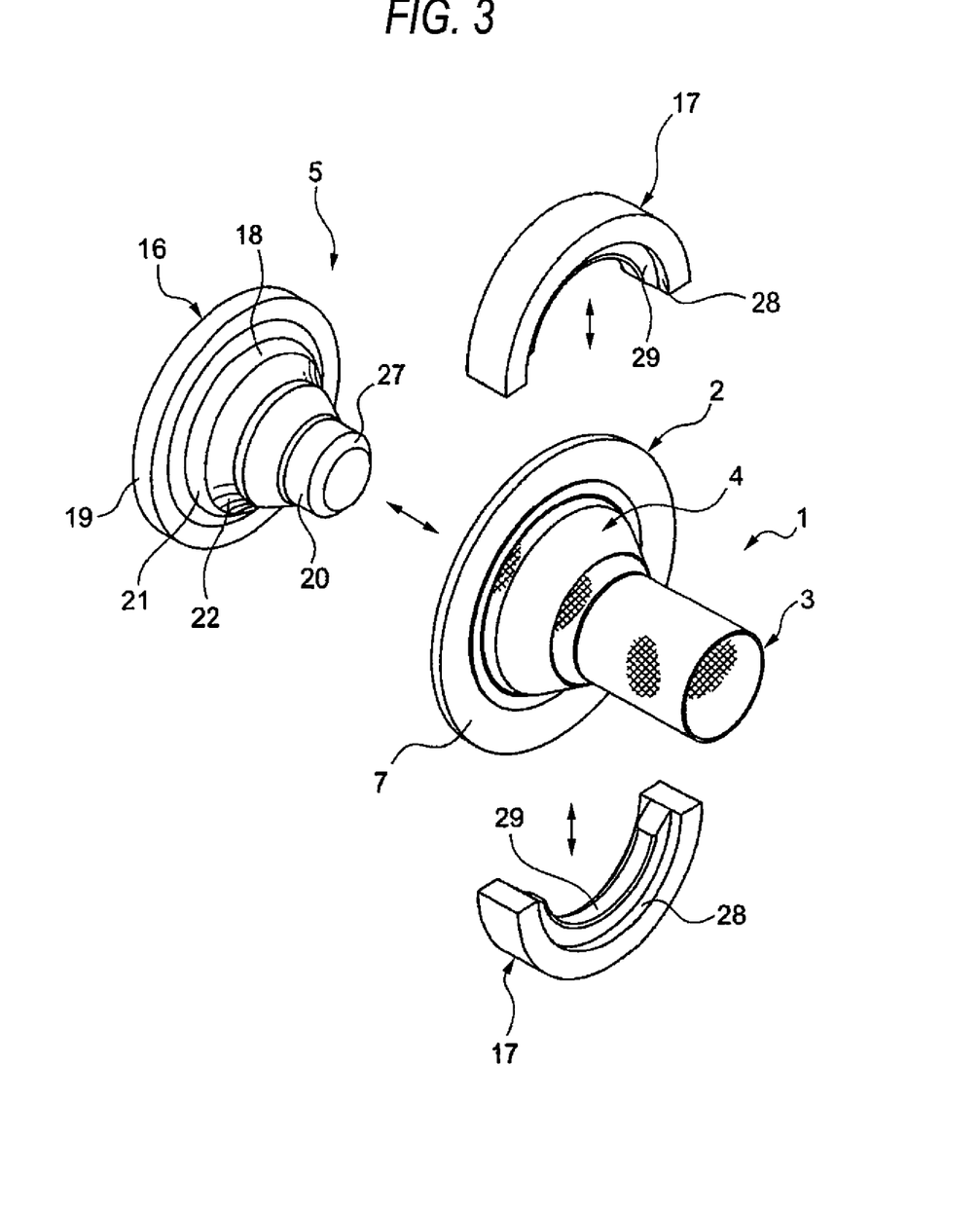
FIG. 3 is a perspective view of a shield wire end part and a caulking die in a situation before caulking is performed.
Figure 4:
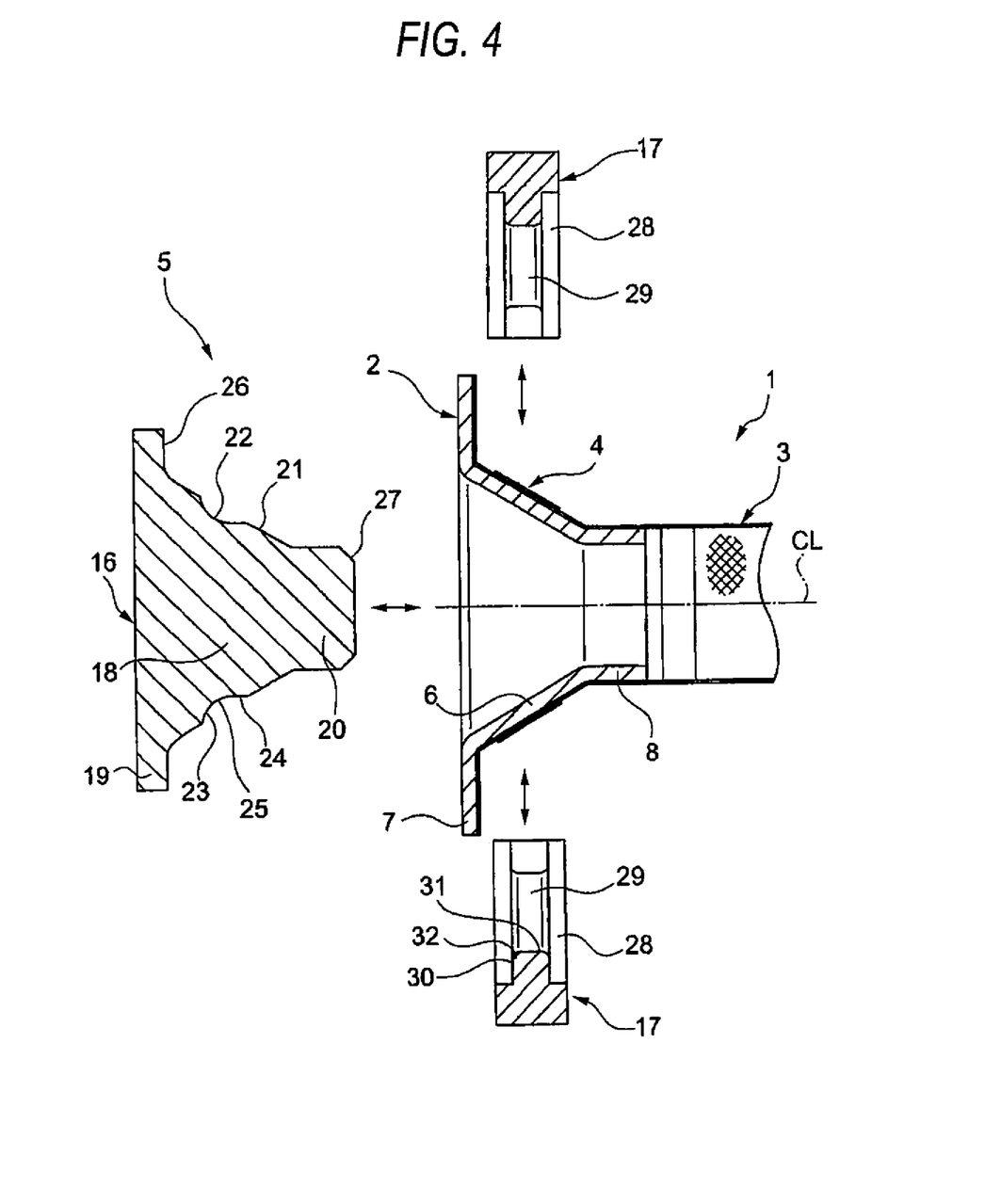
FIG. 4 is a sectional view of a shield wire end part and a caulking die in a situation before caulking is performed.

First, the above-mentioned components are described. Then, the process steps of caulking and the obtained fixing state are described. FIGS. 1 to 4 are referred to. FIG. 2 is an exploded perspective view of a shield wire end part and a caulking die. FIGS. 3 and 4 are a perspective view and a sectional view, respectively, of a shield wire end part and a caulking die in a situation before caulking is performed. Here, the arrow P direction is defined as the forward and rearward directions, while the arrow Q direction is defined as the up and down directions.

The shield shell 2 has a tube-shaped braid holding part 6, a flange 7 formed continuously to the periphery of the circular rear end of the braid holding part 6, and a tube-shaped front part 8 formed continuously to the periphery of the circular front end of the braid holding part 6.

The braid holding part 6 is formed as a part capable of connecting and fixing the end part of the braid 3 (a part to which the end part is fixed). The braid holding part 6 is formed in an inclined structure that the wall 9 is inclined (non-parallel) relative to the center line CL. Specifically, the inner diameter is reduced gradually from the rear end toward the front end (tip) of the braid holding part 6 (the interval between the walls 9 is reduced). Each of the inner peripheral surface 10 and the outer peripheral surface 11 of the braid holding part 6 is formed in the shape of an inclined surface without a depression and a protrusion in a situation before caulking is performed by the caulking die 5 (in a cross sectional view). The wall 9 has a thickness deformable in association with caulking performed by the caulking die 5 (this deformation is plastic).

The flange 7 is a part to be fixed to a shielding case (not shown) for example by screwing. Then, a front face 12 and a rear face 13 thereof are formed in the form of flat surfaces (illustration of the screwing portion is omitted). The flange 7 serves as a part for fixing the shield wire 1 and a part for establishing grounding.

The front part 8 is formed such that the wall 9 is in parallel to the center line CL of the braid holding part 6. That is, the front part 8 is formed in a cylindrical shape. The outer diameter of the front part 8 is set up in accordance with the inner size in a state that the end part of the braid 3 is not spread. Here, the length of the front part 8 in the forward and rearward directions and the formation of the front part 8 are arbitrary.

The braid 3 is formed by braiding thin wires having electric conductivity into a tube shape. The braid 3 is a shielding member. Then, its end part is spread outward and then inserted (outside fit) over the outer peripheral surface 11 of the braid holding part 6.

The caulking ring 4 is a component to be inserted (outside fit) over the braid 3 that is inserted (outside fit) over the outer peripheral surface 11 of the braid holding part 6. The caulking ring 4 is formed in a small thickness such as to be deformable by caulking performed by the caulking die 5 (this deformation is plastic). The caulking ring 4 is formed as a part capable of connecting and fixing the end part of the braid 3 (a part to which the end part is fixed). The caulking ring 4 is formed in an inclined structure such that the wall (reference numeral is omitted) is inclined (non-parallel) relative to the center line CL of the braid holding part 6. Specifically, this formation is such that the inner diameter is reduced gradually from the rear end toward the front end of the caulking ring 4 (the interval between the walls is reduced). Each of the inner peripheral surface 14 and the outer peripheral surface 15 of the caulking ring 4 is formed in the shape of an inclined surface without a depression and a protrusion in a situation before caulking is performed by the caulking die 5 (in a cross sectional view). The caulking ring 4 is formed such that the length in the forward and rearward directions is shorter than the corresponding length of the braid holding part 6.

The caulking die 5 is constructed from: a core 16 freely inserted into and extracted from the braid holding part 6 along the center line CL (axis) of the braid holding part 6 which is in agreement with the forward and rearward directions P; and a pair of dices 17 freely opened and closed in the up and down directions Q perpendicular to the center line CL (illustration and description of a mechanism or the like for moving these dies are omitted).

The core 16 is a die whose inside is filled, and has: a core body 18; a core rear part 19 formed continuously to the circular rear end of the core body 18; and a core front part 20 formed continuously to the circular front end of the core body 18.

The core body 18 is formed in an inclined structure that the outer peripheral surface 21 is inclined relative to the center line CL of the braid holding part 6. Specifically, the diameter is reduced gradually from the rear end toward the front end of the core body 18. A step-shaped receptacle part 22 depressed in a step shape in the circumferential direction is formed in a middle part of the outer peripheral surface 21 of the core body 18 having this configuration (the step-shaped receptacle part 22 is depressed in the circumferential direction relative to the inclined outer peripheral surface 21; thus, the illustrated step shape is formed). The step-shaped receptacle part 22 is formed such as to serve as a receptacle part in a situation that the pair of dices 17 are closed together. In the present embodiment, the step-shaped receptacle part 22 is formed such that the depression side-surface 23 and the depression bottom surface 24 are linked to each other through a curved surface 25 (this is merely an example).

The core rear part 19 is formed in a larger diameter than the core body 18. The core rear part 19 is formed such that a front face 26 thereof abuts against the rear face 13 of the flange 7.

The core front part 20 is formed on the core insertion start side relative to the braid holding part 6. The core front part 20 is formed in the shape of a cylinder having the same diameter as the circular front end of the core body 18 and extending forward. A taper 27 is formed in the periphery of the front end of the core front part 20.

The pair of dices 17 serves as a ring-shaped die when they are closed together. The inner surface 28 of each dice 17 is provided with a stamping protrusion rim 29 that protrudes in the circumferential direction. The stamping protrusion rim 29 is formed in accordance with the shape (sectional shape) of the step-shaped receptacle part 22. That is, the stamping protrusion rim 29 has: a protruding rim side-surface 30 corresponding to the depression side-surface 23; a protruding rim tip surface 31 corresponding to the depression the depression bottom surface 24; and a curved surface 32 corresponding to the curved surface 25.

In the above-mentioned configuration and structure, as shown in FIGS. 3 and 4, the end part of the braid 3 is inserted (outside fit) over the outer peripheral surface 11 of the braid holding part 6 in the shield shell 2. Then, the caulking ring 4 is inserted (outside fit) over the braid 3. After that, as shown in FIG. 1, the core 16 is inserted into the braid holding part 6. Further, the pair of dices 17 are closed together, and then caulking is performed on the connection and fixation target part. As a result, the connection and fixation target part composed of the braid holding part 6, the caulking ring 4, and the braid 3 end part located in between is deformed into a shape that a plurality of bent parts (three bent parts in the present embodiment) are formed in accordance with the sectional shape of the step-shaped receptacle part 22. That is, a fixing state is formed as illustrated, so that connection and fixation between the braid 3 end part and the braid holding part 6 is completed.

When caulking is performed, a protruding rim 33 that protrudes in the circumferential direction is generated in the inner peripheral surface 10 of the braid holding part 6. However, at the time of extracting of the core 16, the protruding rim 33 does not hit the core 16. That is, extracting of the core 16 is allowed. Thus, an effect is obtained that the fixing force for connection and fixation of the braid 3 end part is satisfactorily increased.

Here, additional description is given for the insertion (outside fit) of the caulking ring 4. In a situation that the caulking ring 4 is pressed sufficiently, the degree of adhesion between the end part of the braid 3 and the outer peripheral surface 11 of the braid holding part 6 is improved, and hence the shielding performance is improved.

Embodiment 2

Figure 5:
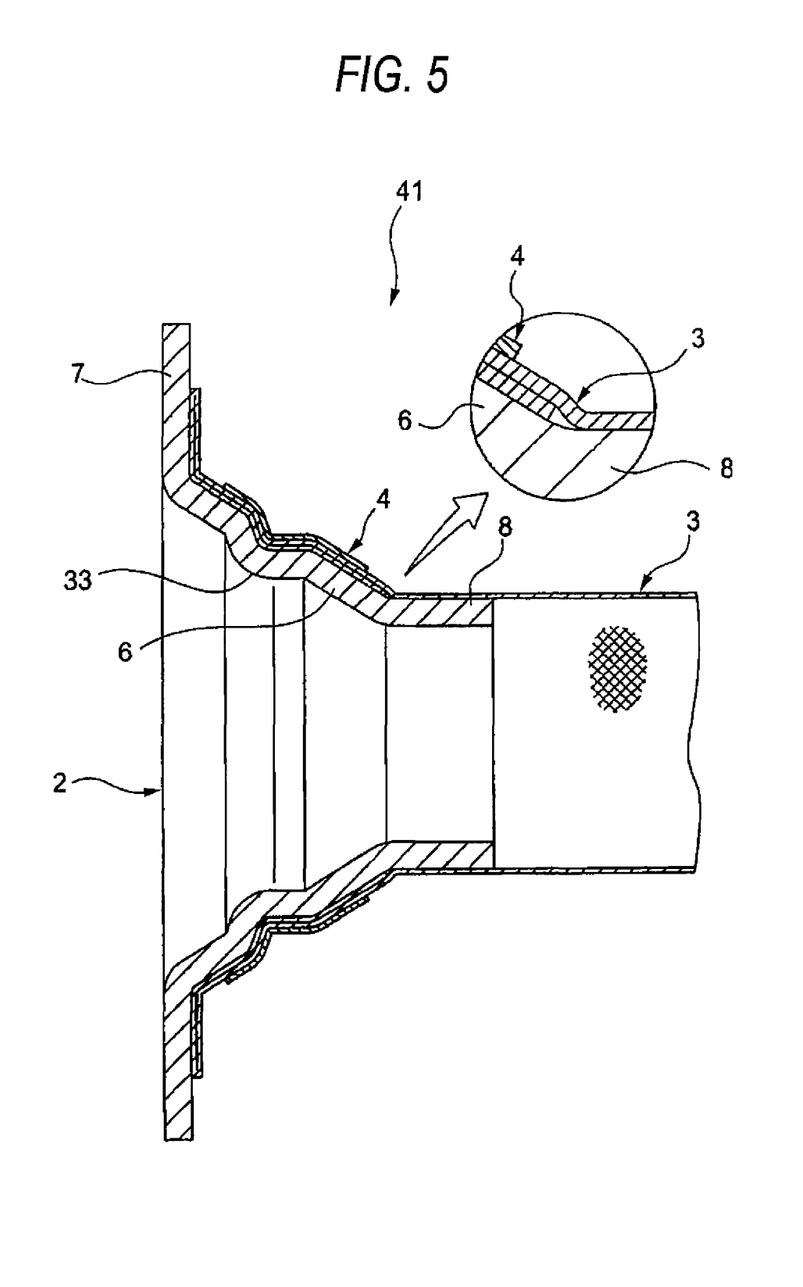
FIG. 5 is a sectional view showing a braid fixing structure for shield wire and a caulking die according to the present invention (Embodiment 2).

A second embodiment is described below with reference to the drawings. FIG. 5 is a sectional view showing a braid fixing structure for shield wire and a caulking die according to the present invention. Here, like members to those in the first embodiment are designated by like numerals, and hence their detailed description is omitted.

In FIG. 5, the shield wire 41 has a different shape of the end part of the braid 3 from that of the shield wire 1 according to Embodiment 1. The other points in the configuration are the same. The end part shape of the braid 3 is such that the end part is folded inward so that a two-ply structure is formed. The two-ply structure in the end part of the braid 3 increases the density of the mesh of the braid 3 connected and fixed to the braid holding part 6. Thus, even when the end part of the braid 3 is spread and then inserted (outside fit) over the braid holding part 6, the mesh opening is suppressed. This provides an effect that satisfactorily shielding performance is achieved. Further, the two-ply structure in the end part of the braid 3 has the effect of avoiding the necessity of after treatment such as cutting a pointed end part in the braid end part.

Embodiment 3

Figure 6:
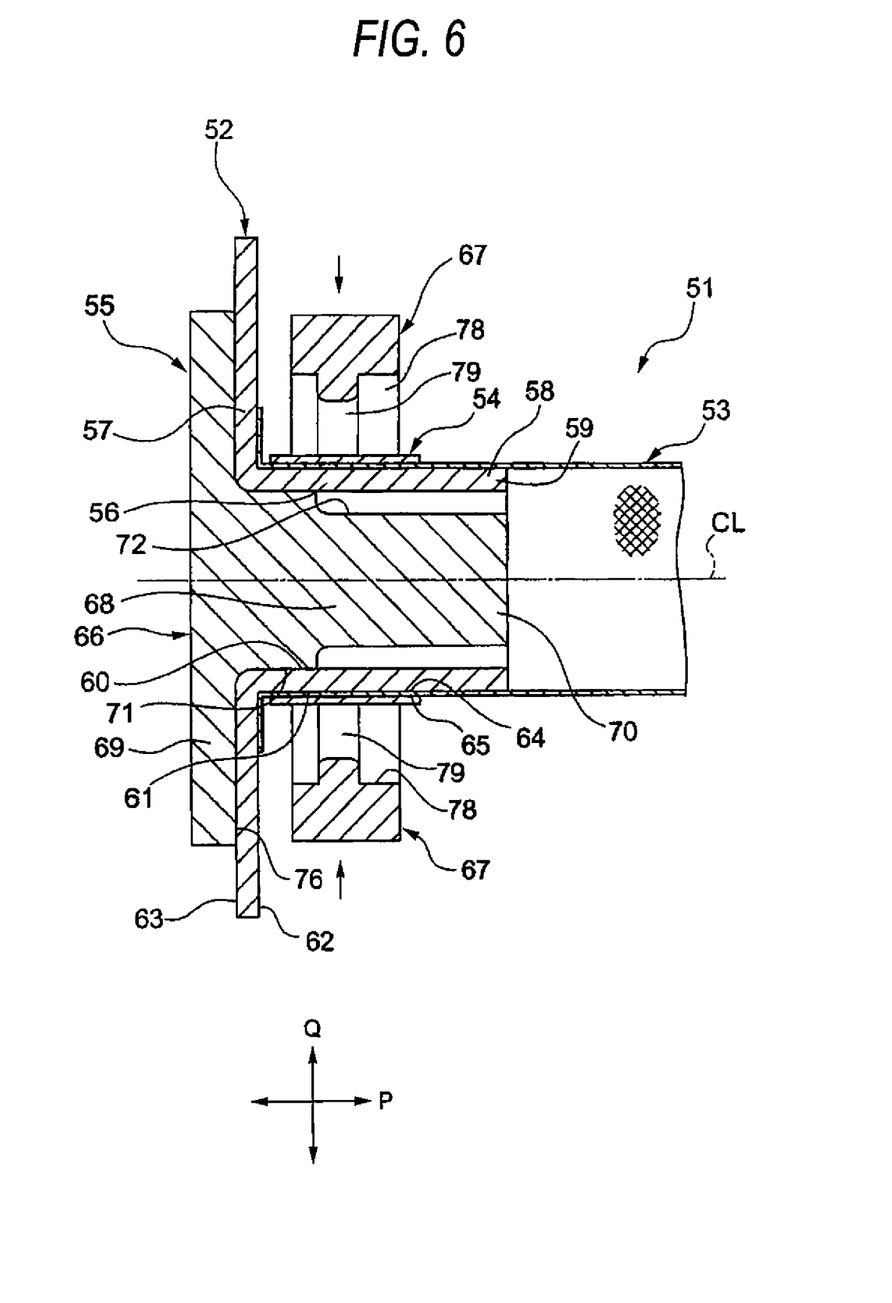
FIG. 6 is a sectional view showing a braid fixing structure for shield wire and a caulking die according to the present invention (Embodiment 3).

A third embodiment is described below with reference to the drawings. FIG. 6 is a sectional diagram showing a braid fixing structure for shield wire and a caulking die according to the present invention.

In FIG. 6, a shield wire 51 according to the present embodiment has: a plurality (e.g., three) of electric wires (not shown); a metal shield shell 52 having electric conductivity; a tube-shaped braid 53 having electric conductivity and collectively covering the plurality of electric wires; and a caulking ring 54 of metal ring construction that is inserted over the end part of the braid 53 and then undergoes caulking.

The shield wire 51 has an end part structure that the end part of the braid 53 is connected and fixed to the shield shell 52 as a result of caulking performed by the caulking die 55. Further, the shield wire 51 has an end part structure that the braid 53 is grounded through the shield shell 52 to a shielding case (not shown). In the connection and fixation between the braid 53 and the shield shell 52, a firm fixation is achieved.

The shield shell 52 has a tube-shaped braid holding part 56, a flange 57 formed continuously to the periphery of the circular rear end of the braid holding part 56, and a tube-shaped front part 58 formed continuously to the periphery of the circular front end of the braid holding part 56.

The braid holding part 56 is formed as a part capable of connecting and fixing the end part of the braid 53 (a part to which the end part is fixed). The braid holding part 56 is formed such that the wall 59 is in parallel to the center line CL of the braid holding part 56. That is, the braid holding part 56 is formed in a cylindrical shape. Each of the inner peripheral surface 60 and the outer peripheral surface 61 of the braid holding part 56 is formed in the shape of a surface without a depression and a protrusion in a situation before caulking is performed by the caulking die 55 (in a cross sectional view). The wall 59 has a thickness deformable in association with caulking performed by the caulking die 55 (this deformation is plastic).

The flange 57 is a part to be fixed to a shielding case (not shown) for example by screwing. Then, a front face 62 and a rear face 63 thereof are formed in the form of flat surfaces (illustration of the screwing portion is omitted). The flange 57 serves as a part for fixing the shield wire 51 and a part for establishing grounding.

The front part 58 is formed such that the wall 59 is in parallel to the center line CL of the braid holding part 56. That is, the front part 58 is formed in a cylindrical shape. The outer diameter of the front part 58 is set up in accordance with the inner size in a state that the end part of the braid 53 is not spread. Here, the length of the front part 58 in the forward and rearward directions and the formation of the front part 58 are arbitrary.

The braid 53 is formed by braiding thin wires having electric conductivity into a tube shape. The braid 53 is a shielding member, and has the same construction as the braid 3 according to Embodiment 1. The braid 53 is inserted (outside fit) over the outer peripheral surface 61 of the braid holding part 56.

The caulking ring 54 is a component to be inserted (outside fit) over the braid 53 that is inserted (outside fit) over the outer peripheral surface 61 of the braid holding part 56. The caulking ring 54 is formed in a small thickness such as to be deformable by caulking performed by the caulking die 55 (this deformation is plastic). The caulking ring 54 is formed as a part capable of connecting and fixing the end part of the braid 53 (a part to which the end part is fixed). The caulking ring 54 is formed such that the wall (reference numeral is omitted) is in parallel to the center line CL of the braid holding part 56. That is, the caulking ring 54 is formed in a cylindrical shape. Each of the inner peripheral surface 64 and the outer peripheral surface 65 of the caulking ring 54 is formed in the shape of a surface without a depression and a protrusion in a situation before caulking is performed by the caulking die 55 (in a cross sectional view). The caulking ring 54 is formed such that the length in the forward and rearward directions is shorter than the corresponding length of the braid holding part 56.

The caulking die 55 is constructed from: a core 66 freely inserted into and extracted from the braid holding part 56 along the center line CL (axis) of the braid holding part 56 which is in agreement with the forward and rearward directions P; and a pair of dices 67 freely opened and closed in the up and down directions Q perpendicular to the center line CL (illustration and description of a mechanism or the like for moving these dies are omitted).

The core 66 is a die whose inside is filled, and has: a core body 68; a core rear part 69 formed continuously to the circular rear end of the core body 68; and a core front part 70 formed continuously to the circular front end of the core body 68.

The core body 68 is formed such that the outer peripheral surface 71 is in parallel to the center line CL of the braid holding part 56. In a middle part of this outer peripheral surface 71 of the core body 68, a step-shaped receptacle part 72 is formed that is depressed in a step shape in the circumferential direction. The step-shaped receptacle part 72 is not formed such as to serve as a receptacle part in a situation that the pair of dices 67 are closed together.

The core rear part 69 is formed in a larger diameter than the core body 68. The core rear part 69 is formed such that a front face 76 thereof abuts against the rear face 63 of the flange 57.

The core front part 70 is formed on the core insertion start side relative to the braid holding part 56. The core front part 70 is formed in the shape of a cylinder that has the same diameter as the formed part of the of step-shaped receptacle part 72 in the core body 68 and that extends forward straightly.

The pair of dices 67 serves as a ring-shaped die when they are closed together. The inner surface 78 of each dice 67 is provided with a stamping protrusion rim 79 that protrudes in the circumferential direction. The stamping protrusion rim 79 is formed in accordance with the shape (sectional shape) of the step-shaped receptacle part 72.

In the above-mentioned configuration and structure, the end part of the braid 53 is inserted (outside fit) over the outer peripheral surface 61 of the braid holding part 56 in the shield shell 52. Then, the caulking ring 54 is inserted (outside fit) over the braid 53. After that, the core 66 is inserted into the braid holding part 56. Further, the pair of dices 67 are closed together, and then caulking is performed on the connection and fixation target part. As a result, the connection and fixation target part composed of the braid holding part 56, the caulking ring 54, and the braid 53 end part located in between is deformed into a state that a plurality of bent parts are formed in accordance with the sectional shape of the step-shaped receptacle part 72. Then, connection and fixation between the braid 53 end part and the network group holding part 56 is completed.

When caulking is performed, a protruding rim (not shown) that protrudes in the circumferential direction is generated in the inner peripheral surface 60 of the braid holding part 56. However, at the time of extracting of the core 66, the protruding rim does not hit the core 66. That is, extracting of the core 66 is allowed. Thus, an effect is obtained that the fixing force for connection and fixation of the braid 53 end part is satisfactorily increased.

Obviously, various kinds of modified implementation is allowed as long as not departing from the spirit of the present invention.

The description given above is based on a basic case of a circular cross section. In addition, the cross section may be an approximately elliptical shape or an approximately oval shape.

What is claimed is:

1. A caulking die for connecting and fixing, by caulking, an end part of a braid in a shield wire including a plurality of electric wires, a metal shield shell having electric conductivity, and a tube-shaped braid having electric conductivity and collectively covering said plurality of electric wires onto an outer peripheral surface of a tube-shaped braid holding part in said shield shell, said caulking die including:
   a core freely insertable into and extractable from said braid holding part along an axis of the braid holding part; and a dice that is freely opened and closed in a direction perpendicular to said axis and performs caulking on a connection and fixation target part;
   wherein said core has a plurality of inclined surfaces including a step-shaped receptacle part depressed in a step shape in a circumferential direction is provided in a middle part of an outer peripheral surface of a core body of said core, while a position of caulking to be performed by said dice is set up in alignment with a position of said step-shaped receptacle part such that a difficulty is not caused in extraction of said core from said braid holding part.

2. The braid fixing structure for shield wire according to claim 1, wherein a part on a core insertion start side relative to the step-shaped receptacle part is formed in a size smaller than that at the position of said step-shaped receptacle part.

3. A braid fixing structure for shield wire for connecting and fixing, by caulking, an end part of a braid in the shield wire including a plurality of electric wires, a metal shield shell having electric conductivity, and a tube-shaped braid having electric conductivity and collectively covering said plurality of electric wires, onto an outer peripheral surface of a tube-shaped braid holding part in said shield shell, wherein
   at the time of connecting and fixing said braid end part to said braid holding part, a caulking die is used that includes: a core freely insertable into and extractable from said braid holding part along an axis of the braid holding part; and a dice that is freely opened and closed in a direction perpendicular to said axis and performs caulking on a connection and fixation target part, and further a caulking ring of metal ring construction is used that is inserted over of said braid end part and then undergoes caulking performed by said dice so as to be deformed, wherein
   said core having a plurality of inclined surfaces including a step-shaped receptacle part depressed in a step shape in a circumferential direction is provided in a middle part of an outer peripheral surface of a core body of said core, while a position of caulking to be performed by said dice is set up in alignment with a position of said step-shaped receptacle part such that a difficulty is not caused in extraction of said core from said braid holding part, and wherein
   caulking is performed in this situation so that a cross-sectional fixing state in said connection and fixation target part composed of said braid holding part, said caulking ring, and said braid end part located in between is made such that a plurality of bent parts are formed in accordance with the sectional shape of said step-shaped receptacle part.

4. The braid fixing structure for shield wire according to claim 3, wherein said tube-shaped braid holding part and said caulking ring of ring shape are formed such that walls thereof are included relative to said axis of said braid holding part and such that the interval between said walls is reduced gradually toward the tip of said braid holding part, and wherein said outer peripheral surface of said core body is also formed such as to be inclined relative to said axis and have a diameter reduced gradually toward said core insertion start side.

5. The braid fixing structure for shield wire according to claim 3, wherein said braid end part is folded inward such that a two-ply structure is formed.

6. The braid fixing structure for shield wire according to claim 3, wherein a part on a core insertion start side relative to the step-shaped receptacle part is formed in a size smaller than that at the position of said step-shaped receptacle part.

7. The braid fixing structure for shield wire according to claim 3, wherein the braid holding part has an inclined surface being shaped to receive the core body.

8. The braid fixing structure for shield wire according to claim 3, wherein the braid holding part has an inclined surface prior to caulking.

9. The braid fixing structure for shield wire according to claim 2, wherein the braid holding part has a plurality of tapered edges as a result of caulking.

* * * * *